No. 861,733. PATENTED JULY 30, 1907.
E. A. KING.
DRIER.
APPLICATION FILED APR. 4, 1907.
11 SHEETS—SHEET 1.
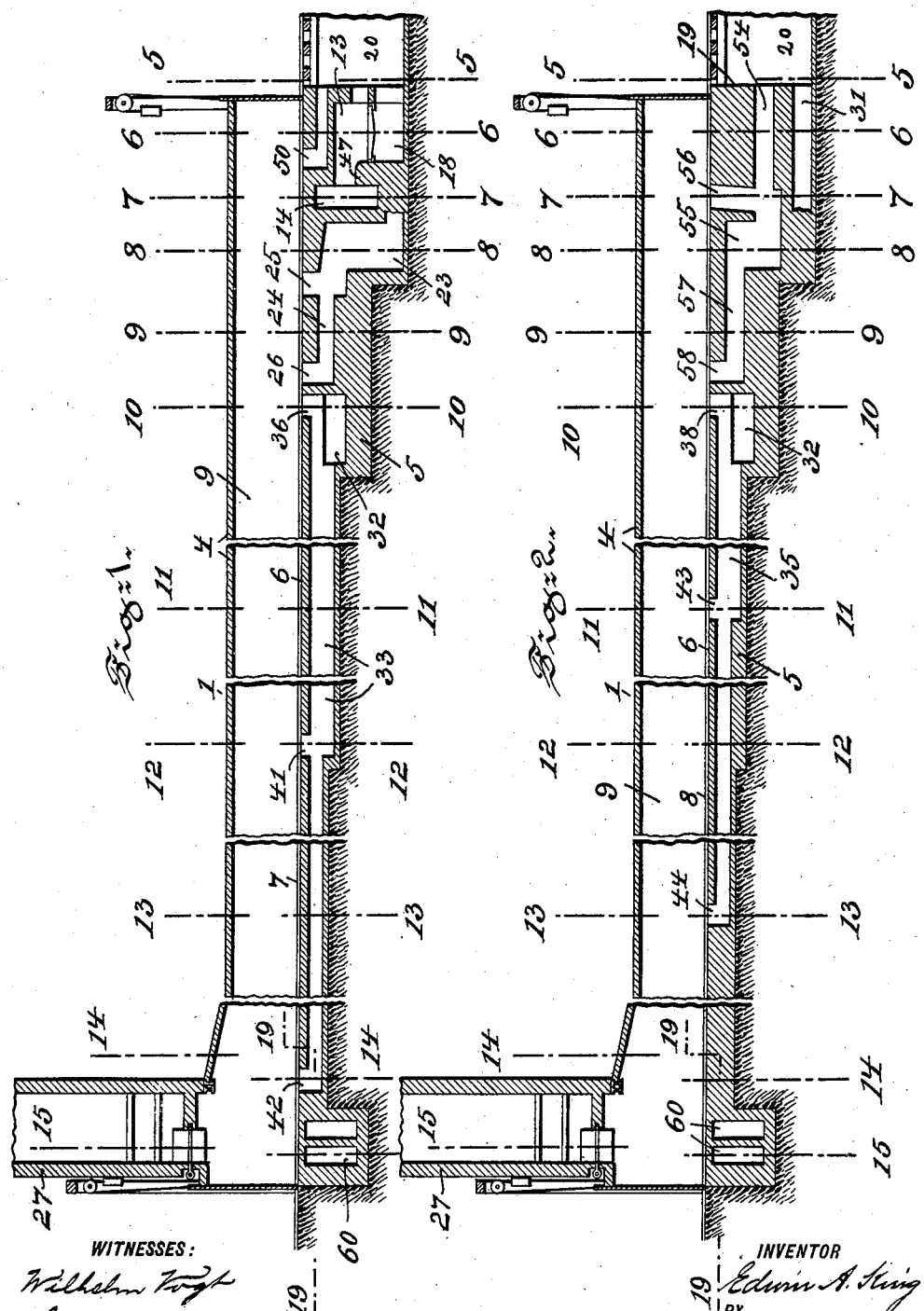

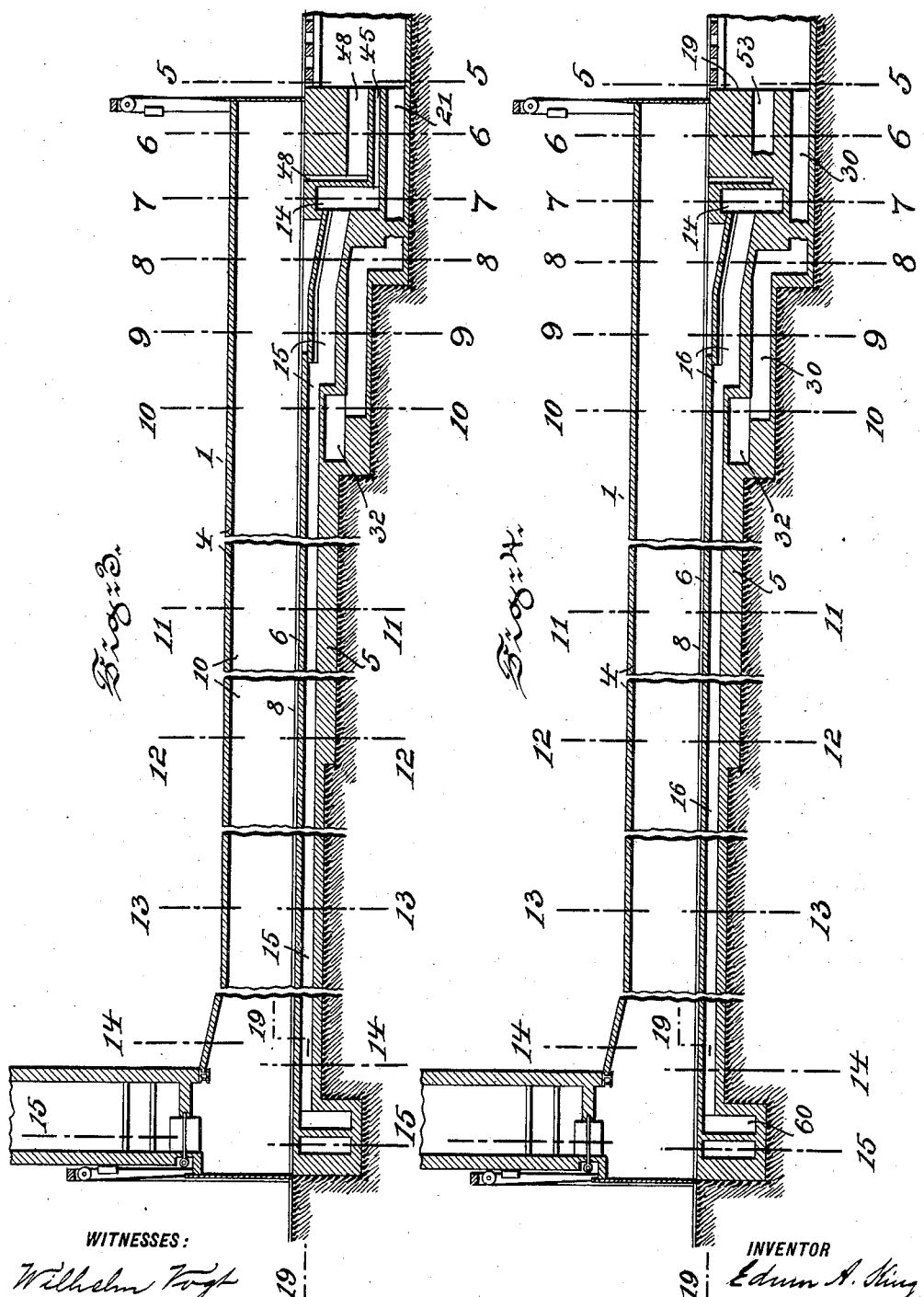

No. 861,733. PATENTED JULY 30, 1907.
E. A. KING.
DRIER.
APPLICATION FILED APR. 4, 1907.
11 SHEETS—SHEET 3.
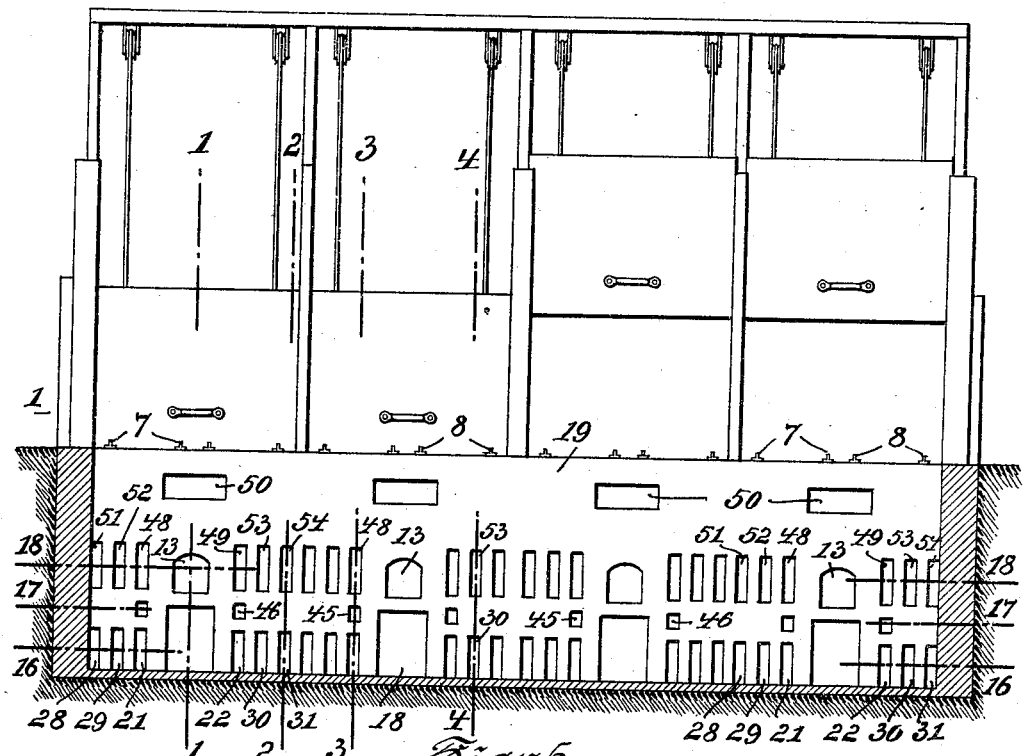
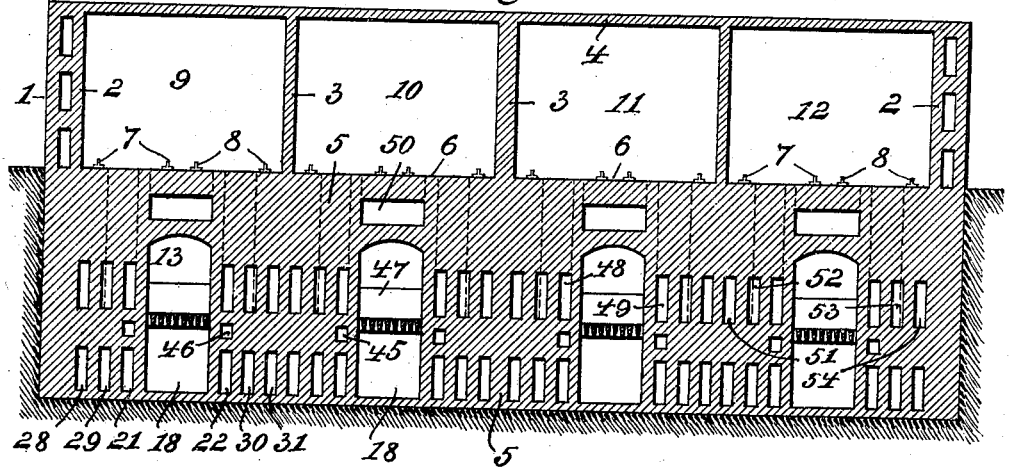
WITNESSES:
INVENTOR
BY
ATTORNEY.

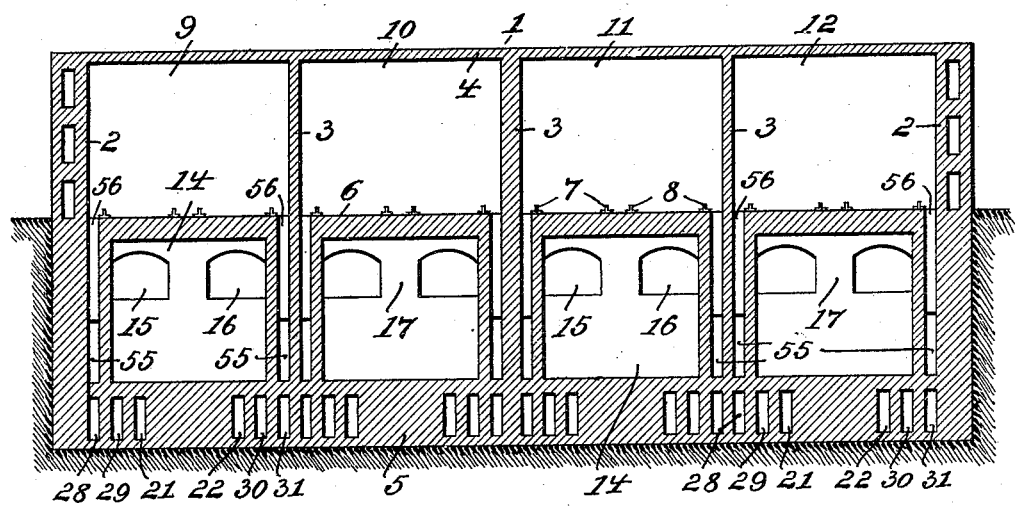
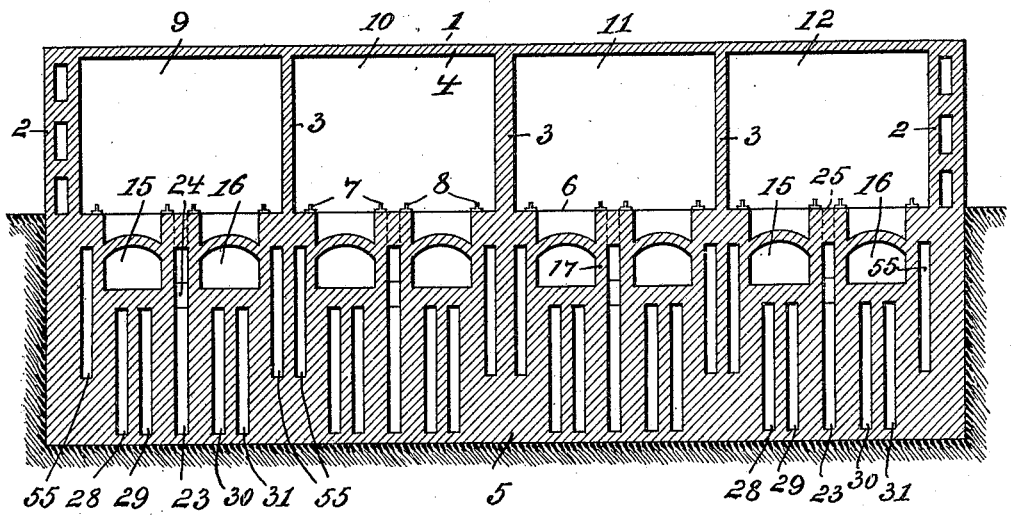

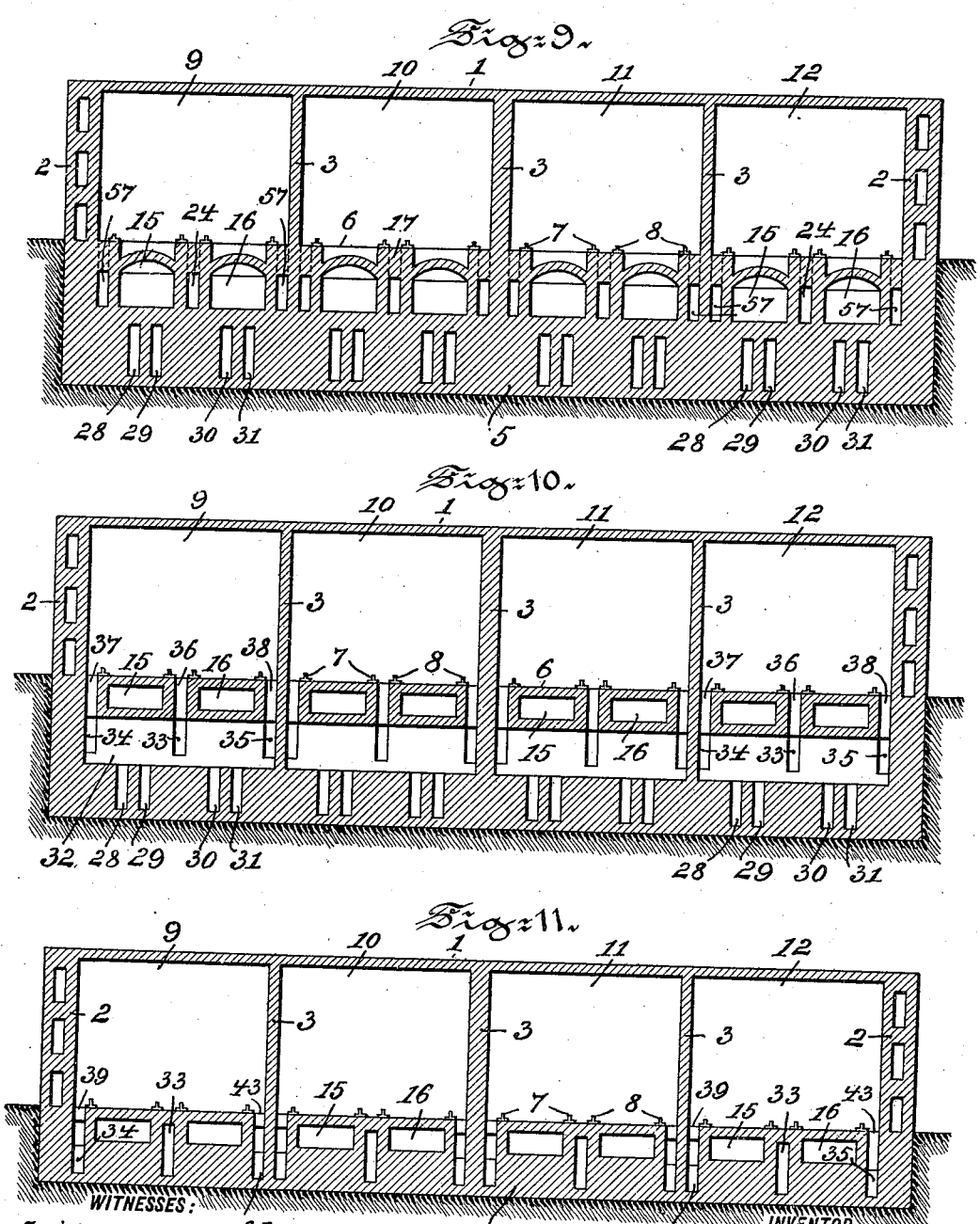

No. 861,733.                                    PATENTED JULY 30, 1907.
E. A. KING.
DRIER.
APPLICATION FILED APR. 4, 1907.
11 SHEETS—SHEET 6.
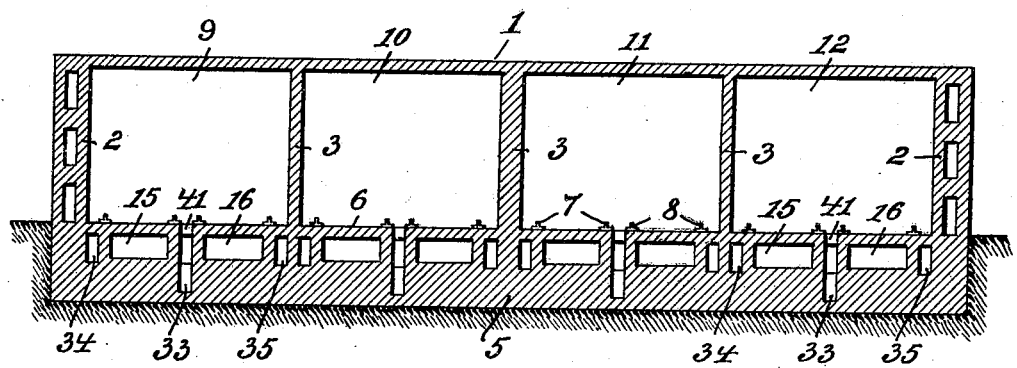
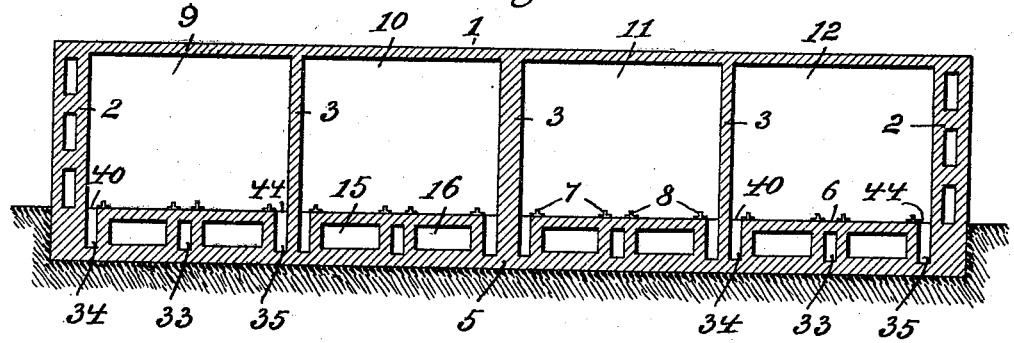
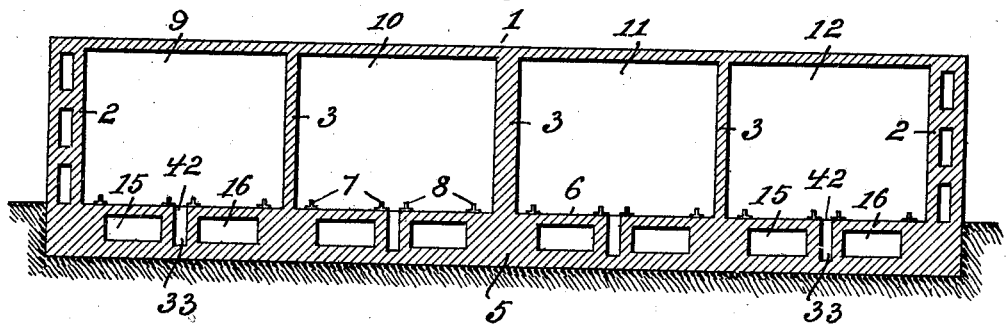
WITNESSES:
INVENTOR
BY
ATTORNEY.

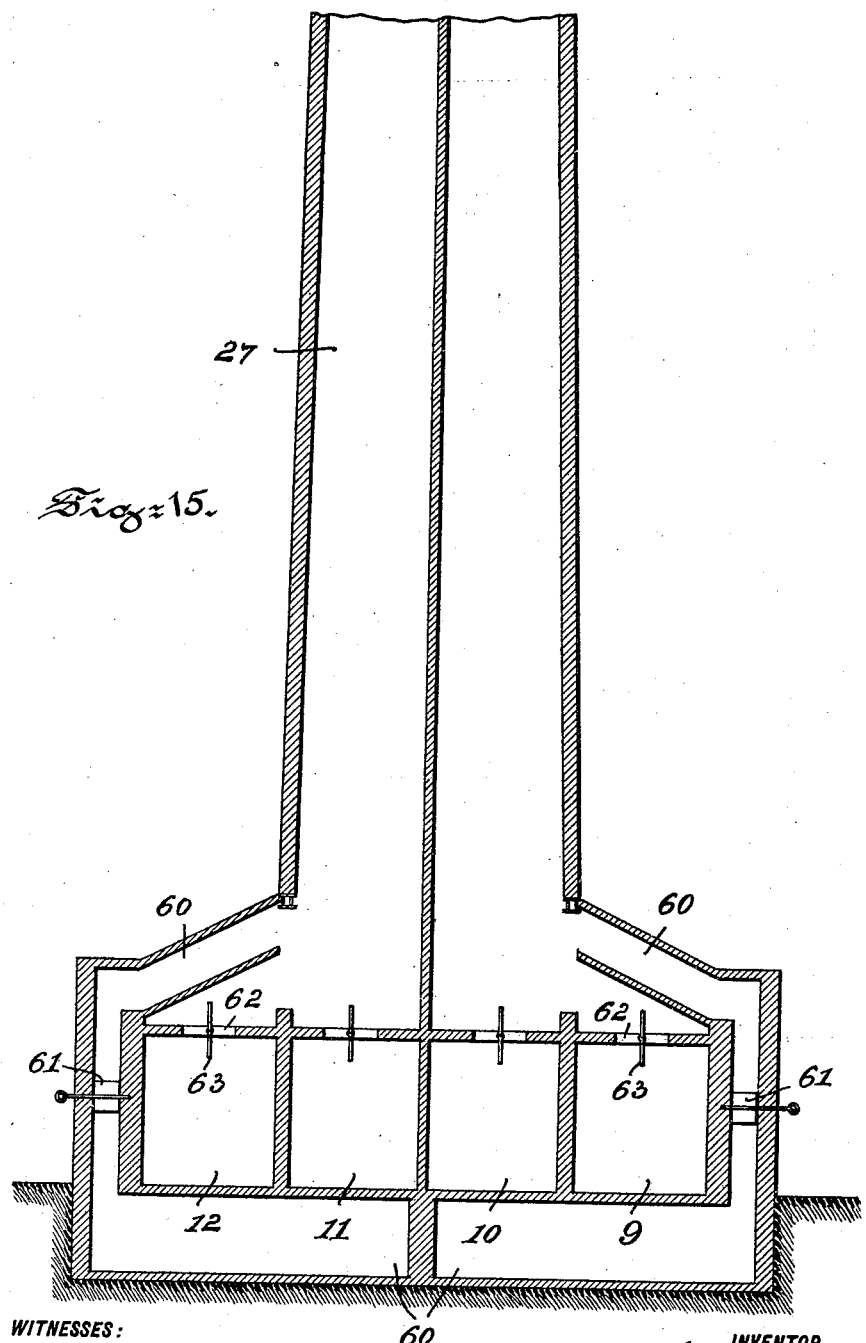

No. 861,733. PATENTED JULY 30, 1907.
E. A. KING.
DRIER.
APPLICATION FILED APR. 4, 1907.
11 SHEETS—SHEET 8.
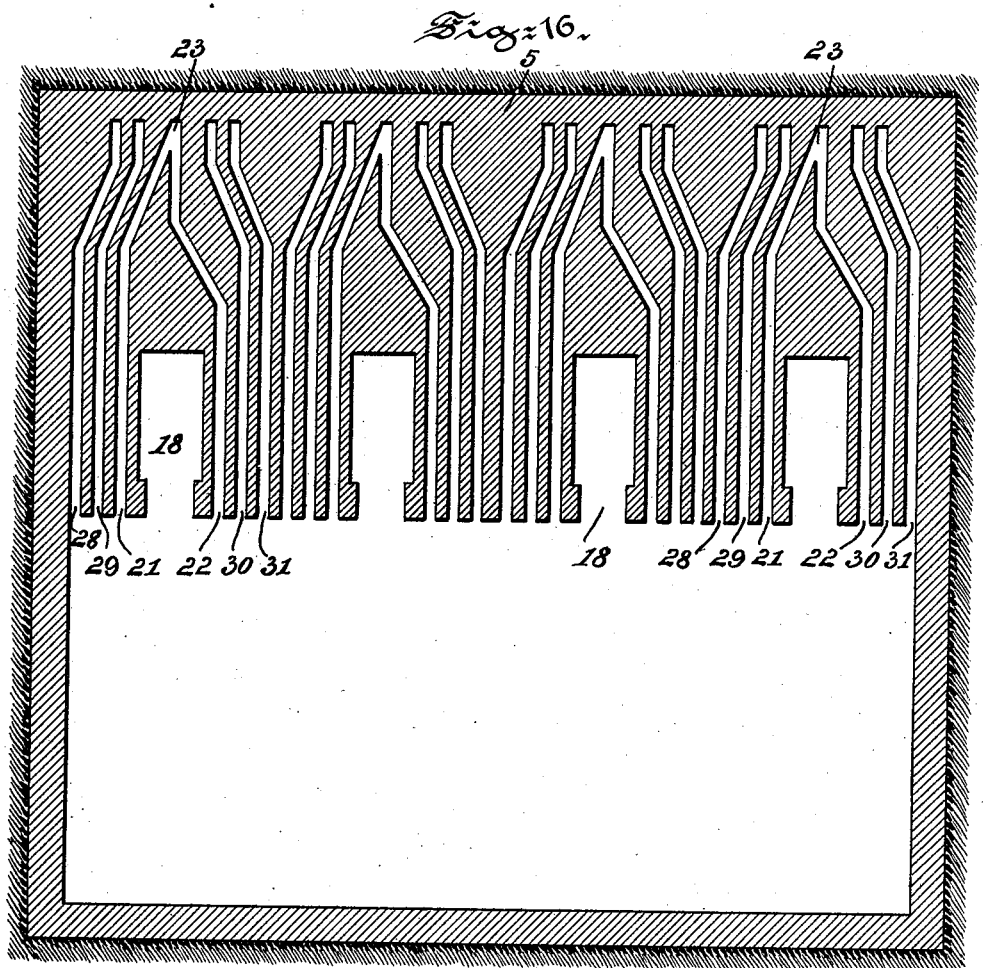
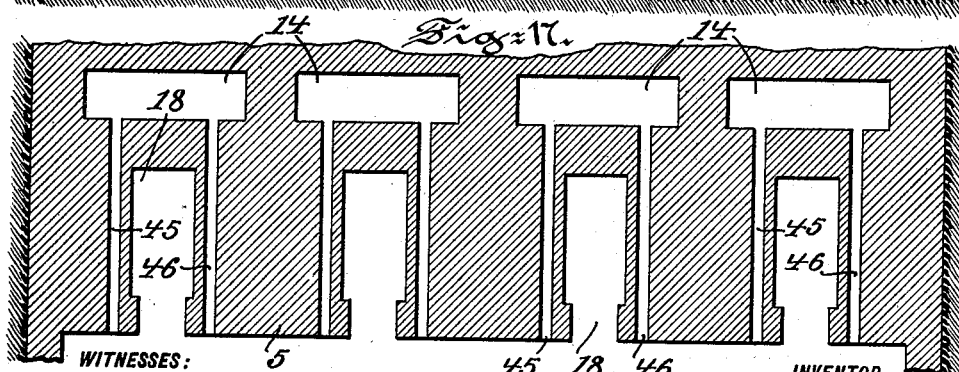

No. 861,733.
PATENTED JULY 30, 1907.
E. A. KING.
DRIER.
APPLICATION FILED APR. 4, 1907.
11 SHEETS—SHEET 9.
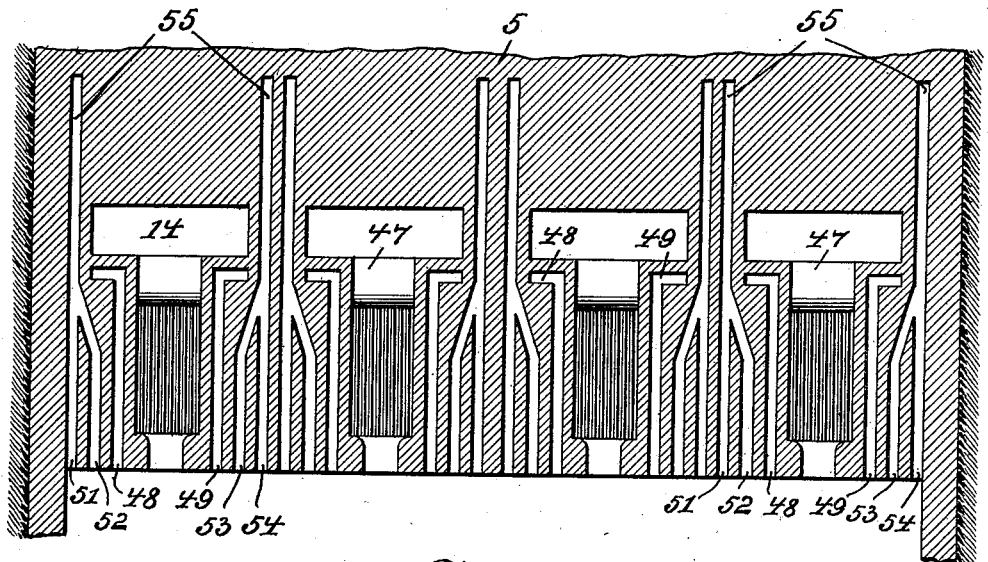
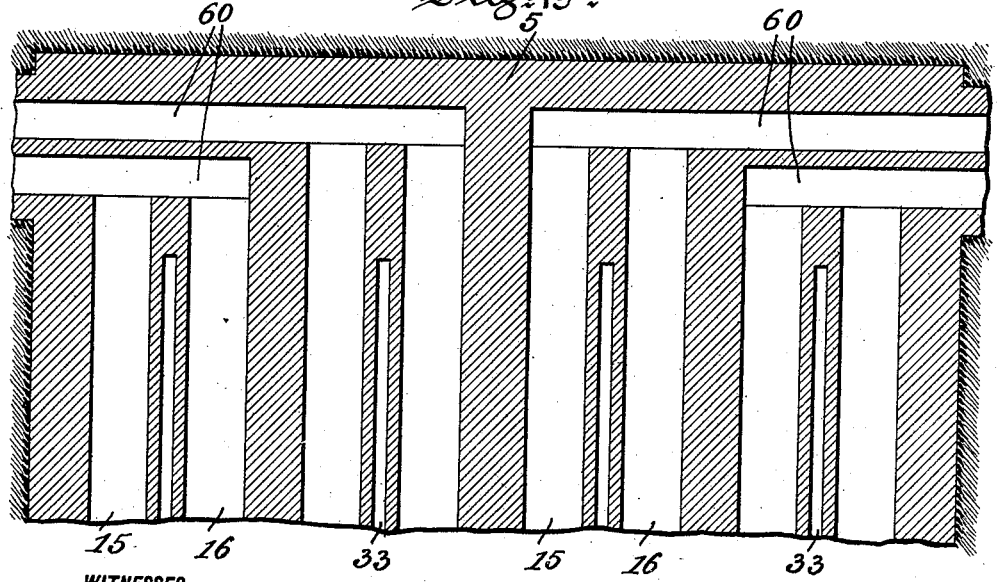

No. 861,733. PATENTED JULY 30, 1907.
E. A. KING.
DRIER.
APPLICATION FILED APR. 4, 1907.
11 SHEETS—SHEET 10.
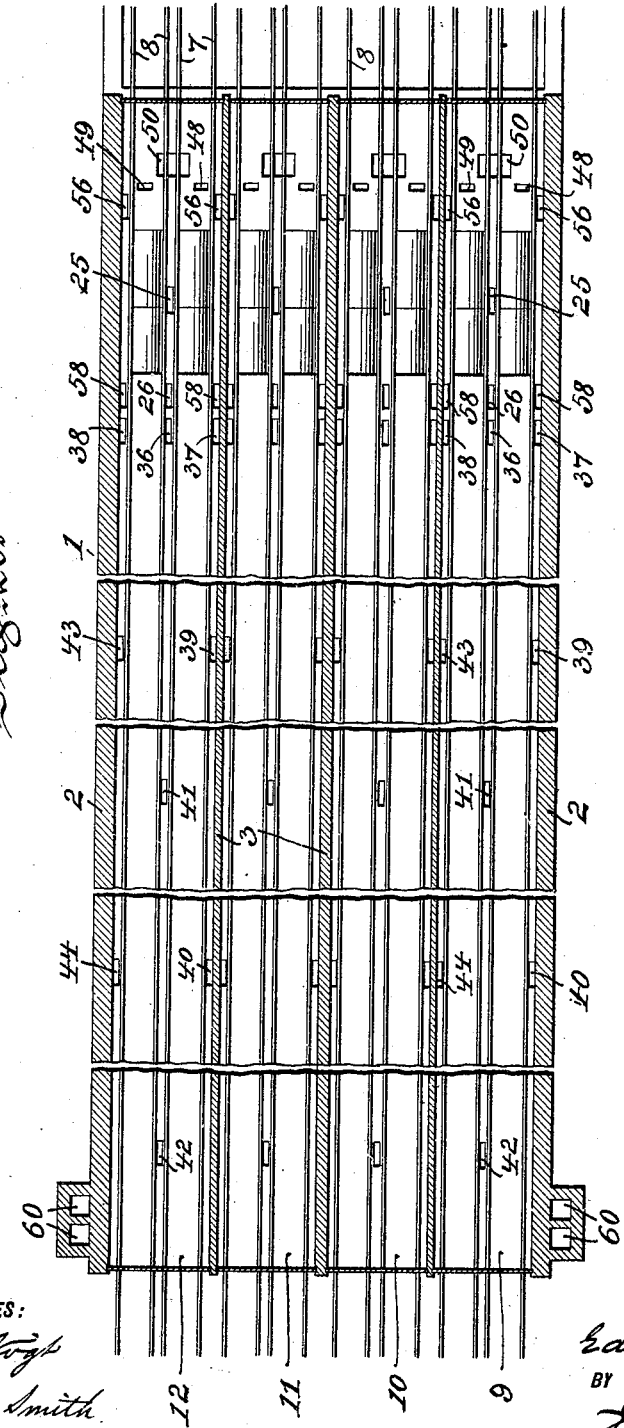

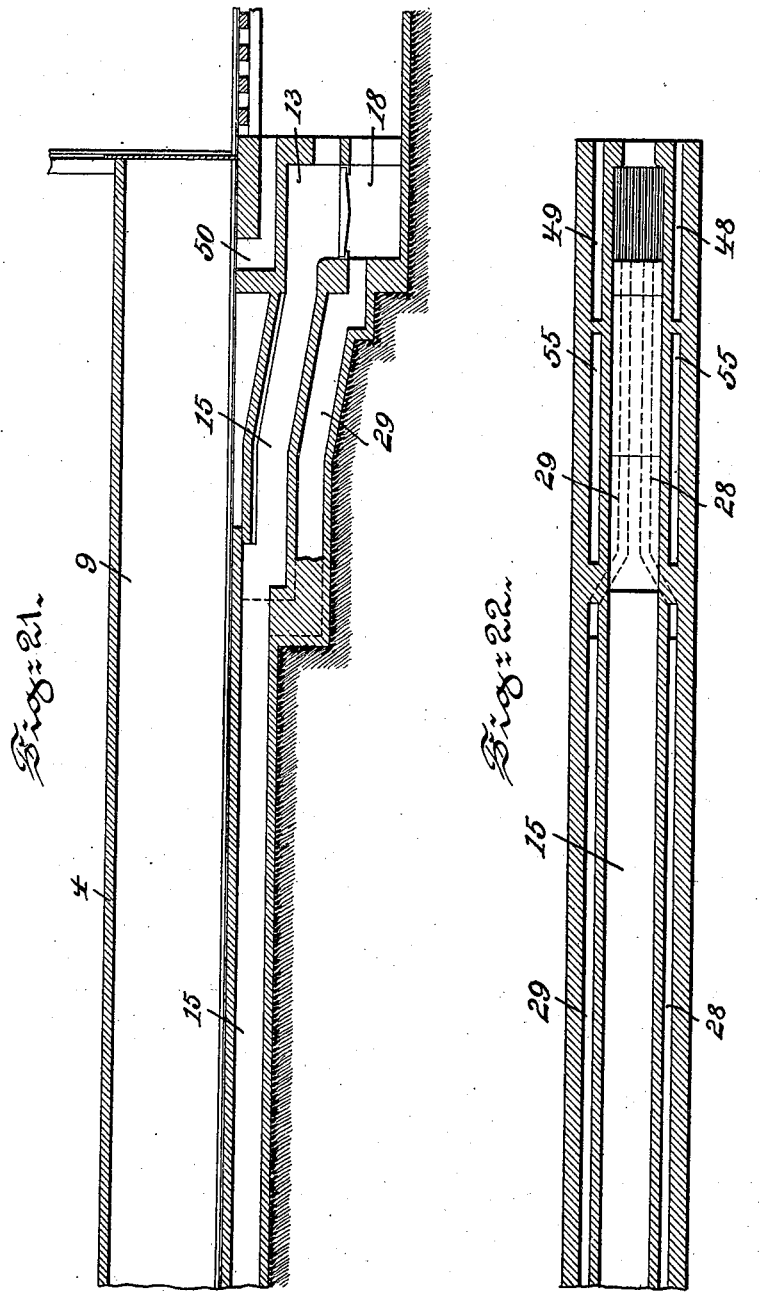

UNITED STATES PATENT OFFICE.

EDWIN A. KING, OF PHILADELPHIA, PENNSYLVANIA.

DRIER.

No. 861,733.  Specification of Letters Patent.  Patented July 30, 1907.

Application filed April 4, 1907. Serial No. 366,265.

*To all whom it may concern:*

Be it known that I, EDWIN A. KING, a citizen of the United States, residing at the city of Philadelphia, in the county of Philadelphia and State of Pennsylvania, have invented certain new and useful Improvements in Driers, of which the following is a specification.

My invention has relation to a drier of the class wherein brick, tile, pottery and other materials are quickly and readily dried by gradually passing through the drier from the warm to the hottest portion thereof; and in such connection it relates more particularly to the construction and arrangement of the air flues of the drier.

The principal objects of my invention are first, to provide a drier with air flues which increase in cross-section in a vertical plane beyond their inlet to permit of free expansion and a suction action by the heated air to continuously draw fresh air into the flues and discharge the same under pressure to aid the stack draft and accelerate the velocity of heated air in passage through the drier; second, to provide the drier with air flues increasing in cross-section in a vertical plane to permit of expansion of air therein and decreasing in cross-section in proportion to the discharge of expanded heated air, at different points from the flues; third, to provide the drier with air flues beneath the smoke flue so as to increase the heating effect of the drier; fourth, to so arrange the air flues that the same for a certain distance pass beneath and then rise and continue at the sides of the smoke flues to permit of a more convenient tapping of the air flues and also at variable points where the heating effect of the air is best suited to produce the most efficient drying of the materials; fifth, to provide the drier with a cross or distributing air chamber to connect the air flues located beneath the smoke flue with airflues arranged alongside of the smoke flue and to conduct and distribute the heated air evenly therein; sixth, to so arrange the airflues of the drier as to permit of a complete utilization of the heat radiated from the furnace chamber, ash pit, recombustion chamber and smoke flues, so as to admit of reduction in the heating area of the furnace of the drier and of a corresponding saving in the fuel used; and seventh, to arrange certain of the air flues sidewise of the furnace chamber with outlets in the rear of the bridge-wall as to insure by the introduction of heated air a complete utilization of the products of combustion, in the recombustion chamber interposed between the furnace chamber and smoke flues thereof.

The nature and scope of my invention will be more fully understood from the following description taken in connection with the accompanying drawings forming part hereof, in which Figure 1 is a longitudinal sectional view of a drier with double track tunnels embodying main features of my invention, the section being on the line 1—1 of Fig: 5. Figs: 2, 3 and 4 are similar views respectively on the lines 2—2, 3—3 and 4—4 of Fig: 5. Fig: 5 is a cross sectional view enlarged on the line 5—5 of either Figs: 1, 2, 3 and 4. Figs: 6, 7, 8, 9, 10, 11, 12, 13, 14 and 15 are similar views on respectively the lines 6—6, 7—7, 8—8, 9—9, 10—10, 11—11, 12—12, 13—13, 14—14 and 15—15 of either Figs: 1, 2, 3 or 4. Fig: 16 is a horizontal sectional view on the line 16—16 of Fig: 5. Figs: 17 and 18 are similar views on the lines 17—17 and 18—18 of Fig: 5. Fig: 19 is a similar view on the line 19—19 of either Fig: 1, 2, 3 or 4. Fig. 20 is a sectional view of the drier taken in a horizontal plane above the floor of the double track drying tunnels. Fig: 21 is a longitudinal sectional view of a drier with a single track tunnel; and Fig: 22 is a sectional view of the drier taken in a horizontal plane below the floor of the tunnel.

Referring to the drawings 1, represents the drier which in the present instance is provided with four drying chambers or tunnels 9, 10, 11 and 12, of a width sufficient to receive double tracks 7 and 8, upon which run the trucks or cars (not shown), in a direction from left to right in Figs: 1 to 4 inclusive, carrying the materials to be dried. The tunnels 9, 10, 11 and 12, are formed by the outer walls 2, and inner or partition walls 3, supporting combined a roof 4, and resting upon a common base serving as a floor 6, upon which the tracks 7 and 8, are placed. Below the floor 6, of each of the tunnels 9, 10, 11 and 12, is arranged a furnace 13, which terminates in a recombustion chamber 14, from which in the present instance extends two smoke flues 15 and 16, divided from each other by a partition wall 17, as shown in Figs: 3 and 8 to 14 inclusive. The roof of the smoke flues 15 and 16, of each of the tunnels form the floor 6 thereof, thus serving to heat the tunnel from end to end. In order to permit of a complete utilization of all heat radiated from the furnace chamber 13, the ash pit 18, thereof, and from the smoke flues 15 and 16, four series of air flues one above the other are arranged for each of the tunnels 9, 10, 11 and 12, each air flue has its inlet in the front wall 19, of the same forming a part of the fuel-pit 20, and certain of the outlets at various points within the tunnel and within the recombustion chamber 14. Thus fresh heated air is supplied to each of the tunnels 9, 10, 11 and 12, to facilitate the drying of the materials therein and also fresh air to the fuel at a point where a complete combustion of the products of combustion is effected. Moreover, the main air flues which supply the tunnels 9, 10, 11 and 12, with heated air, increase in cross-section in a vertical plane beyond their inlets to permit of the free expansion of air therein thus creating a draft which forcibly draws fresh air into the flues and effects a complete circulation of air through each of the tunnels 9, 10, 11 and 12. For this purpose the flues 21 and 22, of the lowermost series of flues and nearest to the ash-pit 18, for example the tunnel 9, extends backwards beyond the recombustion chamber 14, at which point the same are deflected inwards and terminate at this portion in a vertical extension 23, arranged in the central longitudinal axis of the tunnel, the cross-section of which is greater than the combined cross-section of the flues 21 and 22, as shown in Figs: 1 and 16. At its upper portion the extension 23, of the flues 21 and 22, decreases in cross-section in a vertical plane by extending into a branch 24, at the ends of which branch are arranged outlets 25 and 26. The air entering the flues 21 and 22, is heated in its passage therethrough and by being permitted to freely expand in the extension 23 thereof, effects a draft which forcibly and continuously draws fresh air into the flues 21 and 22, and also discharges the air under an accelerated velocity through the outlets 25 and 26. This discharge of air under an accelerated velocity and the drawing of fresh air into the flues 21 and 22, is due to the increased cross-section of the extension 23 of these flues, which increase is so calculated, as to be slightly less than required to accommodate air expanded at a certain temperature, which depends upon the nature of the material to be dried. Thus the increased cross-section being insufficient to afford the room the expanded air requires, the heated air by seeking more room will pass with considerable velocity through the outlets 25 and 26, and this rapid discharge of air will cause a suction action which draws fresh air into the flues 21 and 22. The air by being discharged through the outlet 25, into the tunnel 9, decreases in volume thus permitting of a proportional decrease in the area of the branch 24, of the extension 23, which conducts the remaining portion of the heated air through the outlet 26, into the tunnel 9. The heated air by being discharged through the outlets 25 and 26, into the central and rear portion of the tunnel 9, and between the tracks 7 and 8 thereof, will assist in the drawing action of the air expanding in the flue extension 23, and thus effect a circulation of air through the base 5, and through the tunnel 9, toward the stack 27, which discharges the heated air into the atmosphere.

The air flues 28 and 29 and 30 and 31 of the lowermost series of flues of the tunnel 9, are similarly shaped in that the same first increase and then decrease in size to permit of an expansion of the air therein. As these flues are located too far from the ash-pit 18, to receive any appreciable heat therefrom, the same are conducted below the smoke flues 15 and 16. The heat radiating from the bottom of the smoke flues is thus utilized to heat the air in the flues 28 and 29 and 30 and 31, respectively. In the present instance as shown in Figs: 3, 4, and 10, each set of flues 28 and 29 and 30 and 31, terminate in a cross or distributing chamber 32, from which extend three flues 33, 34 and 35, one of which the flue 33, is located in the partition wall 17, between the flues 15 and 16, and the other flues 34 and 35, at the outer sides of the flues 15 and 16. By this arrangement four flues 28 and 29 and 30 and 31, located beneath the smoke flues 15 and 16, terminate in the cross chamber 32, from which the same are continued as three flues 33, 34 and 35, located on the sides of the smoke flues as shown in Figs: 1, 2, 3, 4 and 10. In instances where the cross-chamber 32, is dispensed with, these flues may be raised at the point where the chamber 32, is located and continued alongside of the smoke flues in the same manner as shown in Fig: 21. This arrangement of flues is preferable, in single track tunnels having only one smoke flue, such as is shown in Fig: 21. The cross chamber 32, owing to its size, permits of a free expansion of the air heated in the flues 28, 29, 30 and 31, and one portion of this heated air by means of outlets 36, 37 and 38, is directly discharged therefrom into the central portion of the tunnel 9, between the tracks 7 and 8 and alongside of the walls thereof at the outer sides of the track, as shown in Figs: 1, 2, 10 and 20. The flues 33, 34 and 35, gradually decrease in size toward the stack 27, in proportion to the volume of air, which by means of the outlets 39, 40, 41, 42, 43 and 44, of the respective flues 33, 34 and 35, is discharged at various points in the front portion of the tunnel 9, between and at the outer sides of the tracks 7 and 8, as shown in Figs: 1, 2, 11, 12, 13 and 14 and 20. These flues owing to their outline will therefore also permit of the free expansion of air, which expansion affects the suction action, forcibly and continuously drawing air into the same and discharging under an accelerated velocity in a highly heated condition into the tunnel 9.

As shown in Figs: 3, 5, 6 and 17, the second series of flues 45 and 46, arranged above the flues 21 and 22, of the lowermost series of flues serve to conduct air into the bottom of the recombustion chamber 14, and directly behind the bridge-wall 47, of the furnace chamber 13. The flues 45 and 46, are heated by the walls of the ash-pit 18, and the air passing therethrough will thus be heated before reaching the recombustion chamber 14, in which the same will be still further heated by heat radiated from the bridge-wall 47; the air therefore, will finally mingle with the products of combustion entering the recombustion chamber 14, and thus effect complete combustion of the products prior to their entrance into the smoke flues 15 and 16.

As shown in Figs: 3, 5, 6, and 18, the flues 48 and 49, of the third series of flues are heated by the side walls of the furnace chamber 13, and are deflected upwards having their outlet in the tunnel 9. Air passing through these flues will thus be highly heated and discharged in the rear portion of the tunnel 9, in which the materials to be dried contain the smallest percentage of moisture. In the heating of the rear of the furnace portion of the tunnel 9, the flues 48 and 49, are assisted by a flue 50, of the fourth or uppermost series of flues, which is arranged above the furnace chamber 13, and terminates in the central portion of the tunnel 9, slightly in rear and between the flues 48 and 49, as shown in Fig: 20. The air passing through this flue 50, will also be highly heated prior to its discharge into the tunnel 9, and will thus completely dry the materials before being discharged from the tunnel 9.

The flues 51, 52, 53 and 54, of the third series of flues arranged alongside of the flues 48 and 49, serve to conduct heated air to the rear portion of the tunnel 9, in the following manner: As shown in Fig: 18, the flues 52 and 53, after having passed the entire length of the furnace chamber 13, are deflected and emerge respectively into the flues 51 and 54. These flues terminate in an extension 55, of increased cross-section in a vertical plane to permit of an expansion of the air therein, from which a portion of the expanded air is discharged from the extension 55, directly into the tunnel 9, by an outlet 56, as shown in Figs. 2 and 20. The extension 55, is then continued in the form of a branch flue 57, of decreased cross-section, which terminates in an outlet 58, discharging the remaining portion of heated air into the rear portion of the tunnel. The flues 51, 52, 53 and 54, their extension 55, and branches 57, are therefore increased in cross-section in a vertical plane beyond their inlet in the front wall 19, of the base 5, and then decrease in cross-section beyond their extension 55, in proportion to the discharge of heated air therefrom. An expansion of the air and suction action similar to that produced by the flues 21 and 22, their extension 23, and branch 24, and by the flues 28, 29, 30 and 31, the cross chamber 32, and branches 33, 34 and 35, will be produced by the outline of the flues 51, 52, 53 and 54, their extension 55, and branch flues 57. The air passing through these flues will be highly heated owing to the proximity of the flues 51, 52, 53 and 54, to the side walls of the furnace chamber 13, and will leave the flues through the respective outlets 56 and 58, under a certain pressure produced by the expansion of the air in the flues. This escape of the air under pressure will aid the stack draft to quickly remove air charged with moisture of the materials from the tunnel 9.

By the above described arrangement of flues all the heat radiated from the furnace chamber 13, ash-pit 18, recombustion chamber 14, and from the bottom and sides of the smoke flues 15 and 16, is utilized to heat air prior to its discharge into the tunnel 9. Owing to this complete utilization of the radiated heat the furnace chamber 13 can be considerably decreased in area, as compared with those now in use in driers, thereby resulting in a corresponding saving of fuel, without affecting the ultimate result sought to be obtained in the drying of materials in the tunnel 9. The arrangement and function of the air flues for the tunnels 10, 11 and 12, is correspondingly similar to those of the tunnel 9. The foregoing description of the air flues for the tunnel 9, applies equally as well to the flues of the tunnels 10, 11 and 12.

The smoke flues 15 and 16, of each of the tunnels 9, 10, 11 and 12, terminate in a single flue 60, which is arranged in the front or entrance end of the drier below the stack 27, as shown in Figs. 1 to 4 and 19. The flues 60, ascend in the front portion of the drier and are deflected towards the base of the stack 27, in which the same terminate, as shown in Fig. 15. Dampers 61, arranged in the flues 60, permit of a regulation and thus of a control of the exit of the products of combustion from the smokeflues 15 and 16, into the stack 27. In a similar manner, each of the tunnels 9, 10, 11 and 12, at its front or entrance end is provided with a vapor damper 63, controlling the outlet opening 62, for the vapor laden air escaping into the stack 27.

By the discharge of highly heated air under an accelerated velocity from the flues, this air assists the stack draft in the removal of the moisture laden air from the tunnels. The velocity as well as the volume of air absorbing the moisture of the materials in the respective tunnels is increased over present driers to such an extent as to prevent the precipitation of moisture on the materials in the front or stack end of the tunnels. Moreover, the moisture laden air concentrating in the stack end of the tunnels is quickly removed by the stack draft aided in this action by the air leaving the flues under great velocity thus preventing precipitation of moisture onto the materials to be dried. The great volume of air passing with greater velocity through the tunnel than in driers of the present construction permits of maintaining a lower temperature therein without affecting the moisture absorbing and consequent drying action. The materials when leaving the tunnels are thoroughly dried and of a temperature which permits of ready handling with bare hands and to be set in the kiln immediately upon leaving the drier.

Having thus described the nature and objects of my invention, what I claim as new and desire to secure by Letters Patent is:—

1. In a drier, a drying tunnel, a furnace, and an air flue arranged in the base of the tunnel and having an inlet and an outlet, said air flue arranged to increase in cross-section in a vertical plane beyond the inlet.

2. In a drier, a drying tunnel, a furnace and a series of air flues arranged in the base of the tunnel and having an inlet and outlets therein, each of said air flues arranged to increase in cross-section beyond the inlet so as to permit of free expansion of air therein.

3. In a drier, a drying tunnel, a furnace and an air flue arranged in the base of the tunnel and having an inlet and an outlet, said air flue arranged to increase in cross-section beyond the inlet thereof and to decrease in cross-section in advance of the outlet.

4. In a drier, a drying tunnel, a furnace and a series of air flues arranged in the base thereof and each having an inlet and outlets therein, said air flues arranged to increase in cross-section beyond their inlets and to decrease in cross-section in advance of their outlets to permit of a forced circulation of air through the flues by free expansion of air therein.

5. In a drier, a drying tunnel, a furnace and a smoke flue arranged in the base thereof, and air flues arranged alongside of said furnace having an extension enlarged in cross-section in the rear and between the smoke flues thereof.

6. In a drier, a drying tunnel, a furnace and a smoke flue arranged in the base thereof, and air flues arranged alongside of the furnace and parallel to and beneath the smoke flue thereof.

7. In a drier, a drying tunnel, a furnace and a smoke flue arranged in the base of the tunnel, and air flues arranged alongside of said furnace and beneath and sidewise of the smoke flue.

8. In a drier, a drying tunnel, a furnace and smoke flues arranged in the base, a chamber arranged beneath said smoke flues, a series of air flues arranged beneath said smoke flues and alongside of said furnace and terminating in said chamber, and a second series of air flues arranged alongside of said smoke flues and extending from said chamber.

9. In a drier, a drying tunnel, a furnace and smoke flues arranged in the base of said tunnel, a chamber arranged beneath said smoke flues, a series of air flues arranged beneath said smoke flues and alongside of said furnace and terminating in said chamber, a second series of air flues arranged alongside of said smoke flues and extending from said chamber, and said chamber arranged to permit of expansion of air therein.

10. In a drier, a drying tunnel, a furnace and a recombustion chamber communicating with said furnace and arranged in the base of said tunnel, and air flues arranged alongside of said furnace and terminating in said recombustion chamber so as to permit of complete combustion of the products of combustion by commingling therewith 11. In a drier, a drying tunnel, a furnace and smoke flues adapted to heat the drying tunnel, one series of air flues located alongside of the furnace and the smoke flues and another series located alongside of the furnace and below the smoke flues, and both series leading from the exterior of the drier to the base of the drying tunnel, more or less, remote from the exit end thereof.

12. In a drier, a drying tunnel, a furnace and smoke flues adapted to heat the drying tunnel directly by radiation, a series of air flues located alongside of the furnace and the smoke flues, another series of air flues located alongside of the furnace and below the smoke flues and rising and extending alongside of the same and both series of flues leading from the exterior of the drier to the base of the drying tunnel, more or less, remote from the exit end thereof.

13. In a drier, a drying tunnel, a furnace and smoke flues adapted to heat the drying tunnel directly by radiation, a chamber located below said smoke flues, a series of air flues located alongside of the furnace and smoke flues and terminating in the exit end of said tunnel, a second series of air flues located alongside of the furnace and below the smoke flues and terminating in said chamber, and a third series of air flues extending from said chamber and terminating in said tunnel, more or less, remote from the exit end thereof and located alongside of said smoke flues.

14. In a drier, a drying tunnel, a furnace and smoke flues adapted to heat said drying tunnel directly by radiation, a series of air flues located alongside the furnace and smoke flues and having extensions of increased cross-section intermediate of their ends, a second series of air flues located alongside the furnace and below the smoke flues, a chamber located below said smoke flues, and a third series of air flues leading from said chamber toward the stack end of the tunnel, said chamber adapted to connect the second and third series of flues with each other and to permit of expansion of air therein.

15. In a drier, a drying tunnel, a furnace having an ash-pit and smoke flues, a recombustion chamber connecting the furnace with the smoke flues, a cross chamber located below the smoke flues, four series of air flues arranged one above the other, the innermost of the lowermost series of said air flues located alongside of the ash-pit and united extending combined upward between said smoke flues and terminating in the exit end of the tunnel, the outer one of the lowermost series of flues located alongside of the ash-pit and below the smoke flues and terminating in said cross-chamber, the second series of air flues located alongside of the ash-pit and terminating in the recombustion chamber, the innermost of the third series of said flues located alongside the furnace and extending upwards between the same and recombustion chamber and terminating in the exit end of the tunnel, the outer one of the said third series of flues located alongside the furnace and united extending combined upwards sidewise to the smoke flues and terminating in the exit end of the tunnel, and an air flue forming the fourth or uppermost series of said flues located above the furnace chamber and extending upwards and in rear of the recombustion chamber and terminating in the exit end of the tunnel.

16. In a drier, a drying tunnel, a furnace having an ash-pit and smoke flues, a recombustion chamber connecting the furnace with the smoke flues, a cross chamber located below the smoke flues, four series of air flues arranged one above the other, the innermost of the lowermost series of said air flues located alongside of the ash-pit and united extending combined upward between said smoke flues and terminating in the exit end of the tunnel, the outer one of the lowermost series of flues located alongside of the ash-pit and below the smoke flues and terminating in said cross chamber, the second series of air flues located alongside of the ash-pit and terminating in the recombustion chamber, the innermost of the third series of said flues located alongside the furnace and extending upwards between the same and recombustion chamber and terminating in the exit end of the tunnel, the outer one of the said third series of flues located alongside the furnace and united extending combined upwards sidewise to the smoke flues and terminating in the exit end of the tunnel, and an air flue forming the fourth or uppermost series of said flues located above the furnace chamber and extending upwards and in rear of the recombustion chamber and terminating in the exit end of the tunnel, and an additional series of air flues extending from said cross chamber located alongside of the smoke flues, and terminating in the tunnel at points more or less remote from the exit end thereof.

17. In a drier, a drying tunnel having a base, a furnace, an air flue arranged in the base and having an inlet and an outlet therein, and a stack connected with said tunnel adapted to remove air therefrom, said air flue arranged to permit of the expansion of air therein and the discharge of air under an accelerated velocity therefrom to aid said stack in the removal of air from said tunnel.

18. In a drier, a drying tunnel having a base, a furnace, air flues arranged in the base and having inlets and outlets therein increasing in cross-section in a vertical plane beyond the inlet and decreasing in cross-section in advance of the outlet and a stack connected with said tunnel adapted to remove air therefrom, said air flues arranged to permit of the free expansion of air therein and the discharge of air under an accelerated velocity therefrom to aid the stack in the removal of air from said tunnel.

In witness whereof I have hereunto set my signature in the presence of two subscribing witnesses.

EDWIN A. KING.

Witnesses:
  W. BENJ. DAVIS,
  JOSEPH W. HOLT.